United States Patent [19]
Kornacki

[11] Patent Number: 5,925,390
[45] Date of Patent: Jul. 20, 1999

[54] CAT FOOD DISPENSING SYSTEM AND METHOD OF MANUFACTURE

[76] Inventor: Joan M. Kornacki, 6 Anne Ter., South Amboy, N.J. 08879

[21] Appl. No.: 08/627,683

[22] Filed: Apr. 2, 1996

Related U.S. Application Data

[51] Int. Cl.[6] ............................. B65B 7/28; B65D 25/04
[52] U.S. Cl. ............................. 426/87; 426/2; 426/115; 426/120; 426/383; 426/805; 119/51.5; 119/61; 119/63; 206/459.5
[58] Field of Search .................... 426/119, 120, 426/115, 108, 2, 87, 383, 805; 119/61, 51.5, 63; 206/459.5

[56] References Cited

U.S. PATENT DOCUMENTS

| | | | |
|---|---|---|---|
| 611,136 | 9/1898 | Mason | 206/459.5 |
| 1,038,644 | 9/1912 | Phin | 426/87 |
| 1,576,026 | 3/1926 | Beakes | 426/87 |
| 1,576,088 | 3/1926 | Bunz | 206/541 |
| 2,007,261 | 7/1935 | Stover | 206/459.5 |
| 2,096,825 | 10/1937 | Roman | 426/114 |
| 2,102,971 | 12/1937 | Petremont | 206/459.5 |
| 2,138,241 | 11/1938 | Koch et al. | 426/119 |
| 2,657,998 | 11/1953 | Peters | 426/119 |
| 2,965,496 | 12/1960 | Serdar | 426/120 |
| 3,394,869 | 7/1968 | Fontana | 426/120 |
| 3,465,873 | 9/1969 | Munz | 426/114 |
| 3,568,875 | 3/1971 | Olan | 119/61 |
| 3,924,009 | 12/1975 | Goldberger et al. | 426/120 |
| 4,314,650 | 2/1982 | Cillario | 426/120 |
| 4,328,254 | 5/1982 | Waldburger | 426/114 |
| 4,574,174 | 3/1986 | McGonigle | 426/114 |
| 4,716,855 | 1/1988 | Andersson et al. | 119/61 |
| 5,346,710 | 9/1994 | Geitner | 426/805 |

FOREIGN PATENT DOCUMENTS

| | | | |
|---|---|---|---|
| 460545 | 10/1949 | Canada | 426/114 |
| 3324462 | 1/1985 | Germany | 426/120 |
| WO88/01248 | 2/1988 | WIPO | 426/114 |

OTHER PUBLICATIONS

Sunday Star Magazine, Wash. D.C. Dec. 4, 1955 p. 60.

Restaurants & Institutions 99(7) Mar. 6, 1989, p. 196 (Dialog Abstract).

Frozen Food Age 41(3) Oct. 1992 p. 78 (Dialog Abstract).

Food Engineering Dec. 1954 p. 165.

*Primary Examiner*—Steven Weinstein
*Attorney, Agent, or Firm*—Brian K. Dinicola

[57] ABSTRACT

A multiple-compartmented cat food serving system for simultaneously introducing at least two differently flavored cat food products in a manner which allows the cat owner to determine which foods appeal to the cat and which foods do not. In accordance with an illustrative embodiment of the inventive system, different flavors of cat food products are supplied at the point of purchase in respective compartments of a sealed, multiple-compartmented receptacle. If desired, one of the receptacle compartments may be supplied empty so that the cat owner may fill it with a small quantity of water for consumption with the meal. In order to allow the cat owner to ascertain whether a particular flavor is not being eaten by his or her cat, each compartment of the receptacle has associated therewith indicia to identify the flavor of the food product contained therein. If one or more newly introduced flavors of cat food do not appeal to the cat, then the owner may avoid purchasing and serving those flavors in the future. If, however, all of the flavors introduced by a multiple-compartmented receptacle in accordance with the present invention are met with favor, the owner may either purchase additional multiple compartmented containers of that type or purchase single serving receptacles containing one of these "favored flavors".

8 Claims, 2 Drawing Sheets

CAT FOOD DISPENSING SYSTEM AND METHOD OF MANUFACTURE

TECHNICAL FIELD

The present invention relates generally to pet food packaging and, more particularly, to sealed receptacles containing one or more servings of cat food for immediate consumption upon opening.

BACKGROUND OF THE INVENTION

Traditionally, cats have been provided with food and water through the use of food bowls or dishes and water containers. The pet food is typically placed within a food bowl or receptacle and is allowed to remain available to the cat either until it is fully consumed or until it appears unlikely that the cat will consume the uneaten portion. More recently, and in the interest of convenience for the cat owner, pet food suppliers have marketed individual serving containers from which a cat can dine directly, thereby sparing the owner of the periodic need to clean out the food bowl.

One advantage of individual serving containers is that they make it easier and less costly for the cat owner to accumulate a variety of different flavors and types (e.g., dry or moist) for his or her pet. As will be readily appreciated by those knowledgeable about the feeding behavior of cats, they are very finicky and it is therefore difficult to predict, on any given day, how one's cat will react to a particular type and/or flavor of food. Thus, a food which is regarded by the owner as a favorite of his/her cat may, at times, go uneaten. Of course, other types and flavors of cat food may not appeal to the cat on any occasion. For this reason, it is a typical strategy of the cat owner to purchase a variety of cat food products in the hopes of always having something on hand that pleases his/her pet.

For every new type and flavor of cat food the owner wishes to introduce to his/her cat, it has heretofore been necessary to purchase an entire individual serving container. As such, before identifying a satisfactory number of different foods that appeal to a cat, its owner may spend a great deal of money and see a substantial quantity of expensive food go to waste. Moreover, given the finicky nature of cats as noted above, even foods that are usually popular with the cat may occasionally go uneaten.

SUMMARY OF THE INVENTION

The above problem is solved and advance is made in the art in accordance with the present invention by a multi-compartmented cat food serving system for simultaneously introducing at least two different cat food products in a manner which allows the owner to determine which foods appeal to the cat and which foods do not, while also minimizing the likelihood that the entire contents of container will be wasted. In accordance with an illustrative embodiment of the inventive system, the at least two different food products are supplied at the point-of-purchase in respective compartments of a sealed, multiple-compartmented receptacle. By way of example, a receptacle utilized in the system of the present invention may be provided with three compartments, each containing a different flavor of cat food. The food contained in the multiple compartments may be all of one type such, for example, as moist or dry, or some combination thereof. If there are plural cats in a given household, the provision of multiple compartments may actually facilitate a shared dining experience as each cat eats from a different compartment.

In order to allow the cat owner to ascertain whether a particular flavor is or is not being eaten by his or her cat, each compartment of the receptacle may be provided with indicia to identify the flavor associated therewith. Alternatively, an external label having suitable markings such, for example, as color codes, written description, an illustration of the animal for which the food product is flavored, or the like, respectively aligned with a corresponding compartment may be applied, deposited, or otherwise formed on the receptacle. Accordingly, if one or more newly introduced flavors of cat food do not appeal to the cat, then the owner may avoid purchasing and serving those flavors in the future. Alternatively, if all of the flavors introduced by a multiple-compartmented receptacle in accordance with the present invention are met with favor, the owner may either purchase additional multiple compartmented containers of that type or purchase single serving receptacles containing one of these favored flavors.

In accordance with an especially preferred embodiment of the present invention, the lid of the receptacle may be partially pre-cut or perforated to define multiple lid portions, with each lid portion being respectively aligned with a corresponding compartment. Each such lid portion may be further provided with an attachment to facilitate opening such, for example, as a pull tab or other conventional structure, so that one type or flavor may be introduced at a time. Advantageously, this arrangement may serve to preserve the freshness of the other, unopened compartments, until the cat is ready for them. Of course, for ease and economy of manufacture, a single lid—with or without an attachment to facilitate opening, may be employed without departing from the spirit and scope of the present invention.

In accordance with a slightly modified embodiment of the present invention, one of the receptacle compartments may remain empty until after formation or application of the lid during manufacture so that the cat owner may fill it with a small quantity of water for consumption with the meal. Illustratively, a receptacle employed in the system of the present invention may be provided with a central compartment, for receiving water, surrounded by a plurality of food receiving compartments.

Other and further features of the present invention will become obvious to one skilled in the art from the description of the illustrative embodiments and accompanying drawings that follow.

BRIEF DESCRIPTION OF THE DRAWINGS

So that the manner in which the above recited features and advantages of the present invention are attained and understood in detail, a more particular description of the invention, briefly summarized above, may be had by reference to the embodiments thereof illustrated to the appended drawings, in which.

DETAILED DESCRIPTION OF THE INVENTION

Figure 1:
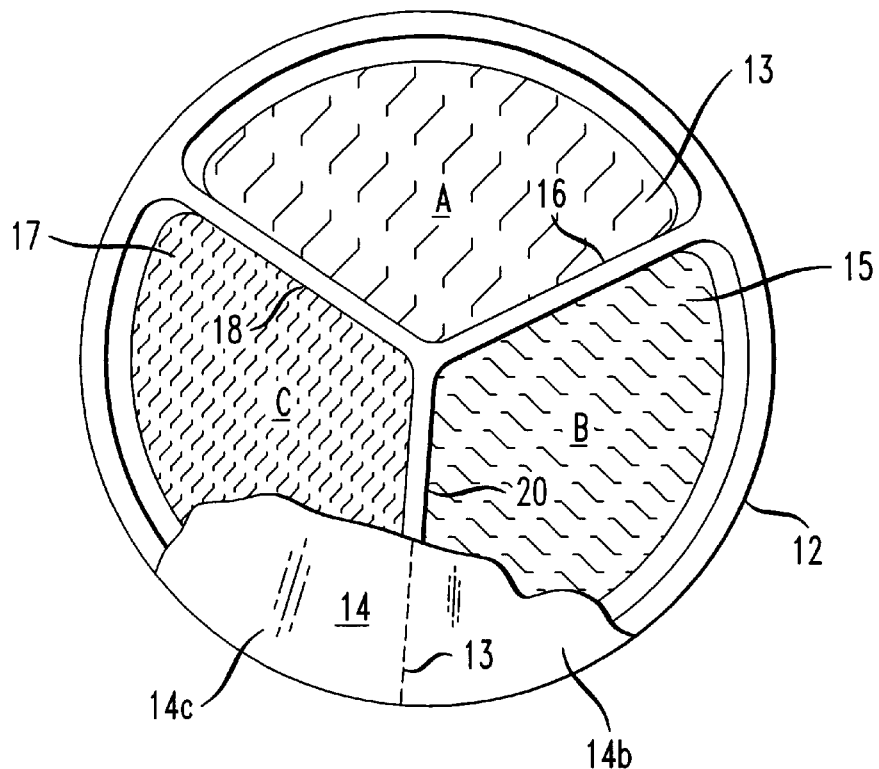
FIG. 1 is a plan view of a receptacle employed in a food serving system constructed in accordance with an illustrative embodiment of the present invention, the receptacle being shown with the cover partially broken away to reveal respective food products contained within each compartment.

Referring now to the drawings, in which like reference numerals identify like elements throughout the several views, there is shown in FIG. 1 a point of purchase cat food serving system 10 constructed in accordance with an illustrative embodiment of the present invention. It should be noted that as utilized herein, the phrase "point-of-purchase" in connection with a cat food serving system is intended to refer to a single, sealed container having different flavors and/or types of cat food contained therein for purchase by the consumer at, for example, the pet food section of a supermarket or other retail establishment.

In any event, and with continued reference to FIG. 1, it will be seen that cat food system 10 comprises a receptacle 12 having a plurality of cat food containing compartments. The cover or lid 14 of receptacle 12 is partially broken away to reveal the interior construction of the latter.

In the embodiment depicted in FIG. 1, lid 14 is partially pre-cut or perforated along line 13 to define multiple lid portions, only two of which—generally indicated at 14b and 14c—are shown. Each lid portion, as lid portions 14b and 14c, is respectively aligned with a corresponding compartment and provides a hermetic seal thereover to thereby protect the contents thereof. In a conventional manner, each lid portion is provided with an attachment to facilitate opening (not shown) such, for example, as a pull tab or other conventional structure, so that one type or flavor may be served to the cat at a time. Advantageously, this arrangement may serve to preserve the freshness of the other, unopened compartments, until the cat is ready for them. Of course, for ease and economy of manufacture, a single lid—with or without an attachment to facilitate opening, may be employed without departing from the spirit and scope of the present invention.

Figure 2:
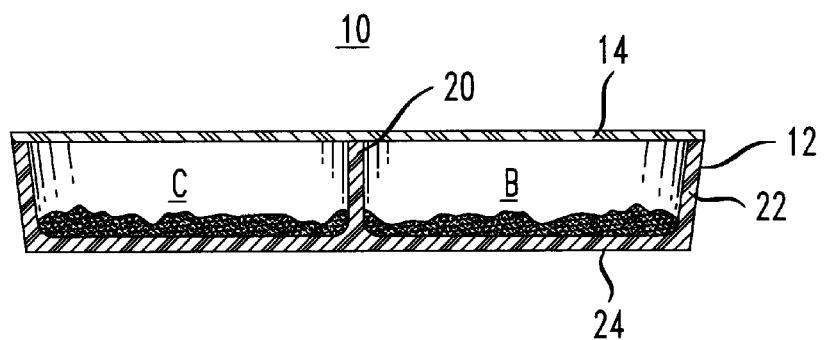
FIG. 2 is a sectional view of the multiple-compartmented receptacle of FIG. 1.

With continued reference to FIG. 1, it will be seen that in the embodiment illustrated therein there are three individual compartments A, B and C defined by wall structures 16, 18, and 20. It will, of course, be readily appreciated by those skilled in the art that fewer or additional compartments may be provided. In FIG. 2, there is shown a sectional view of the multiple-compartmented receptacle of FIG. 1, prior to opening by the consumer. As seen in FIG. 2, upper (i.e., top) and lower (i.e., bottom) walls 14 and 24, respectively, of receptacle 12, seal opposite peripheral regions of sidewall 22 to thereby retain the hermetic seal that preserves the freshness of the contents of receptacle 12.

In accordance with the present invention, each of compartments A, B, and C contains a different type and/or flavor of cat food. By way of illustrative example only, compartment A may be derived from a fish such, for example, as mackerel or tuna, compartment B may be derived from poultry, such as turkey or chicken, while compartment C may be derived from meat, such as beef or lamb. It will be readily appreciated by those skilled in the art that a wide variety of combinations of any of the above foods and others may be provided, the objectives of the purchaser being to discern what types and flavors of food are acceptable to his or her cat and, thereafter, to provide the cat with a varied, interesting diet that includes such acceptable foods. Accordingly, within the same receptacle, some compartments may contain moist foods, while one or more others may contain a dry food.

Figure 3:
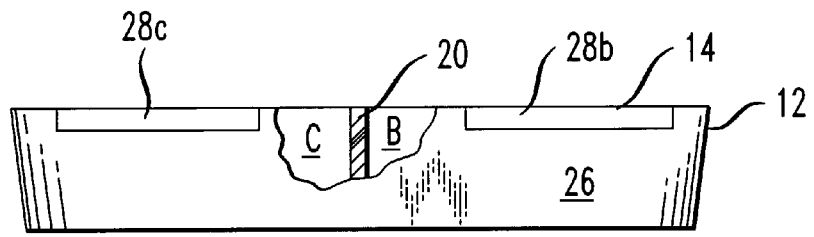
FIG. 3 is a side elevation view of an illustrative embodiment of the inventive food serving system employing the receptacle of FIGS. 1 and 2, with the sidewall of the receptacle partially broken away to reveal both the contents of two adjacent compartments and their associated indicia.

FIG. 3 is a side elevation view of an illustrative embodiment of the inventive food serving system 10 employing the receptacle 12 of FIGS. 1 and 2, with the sidewall 22 of the receptacle partially broken away to reveal the interior of adjacent compartments B and C. As indicated above, it is an objective of the present invention to allow the cat owner to ascertain whether a particular flavor is or is not being eaten by his or her cat. To this end, each compartment of the receptacle has associated therewith indicia to identify the flavor and/or type of the food product contained therein. In the illustrative embodiment of FIG. 3, the indicia takes the form of markings, only two of which—indicated generally at 28b and 28c in FIG. 3—are shown, on an external label 26. As seen in FIG. 3, the markings are respectively aligned with a corresponding compartment, as compartments B and C in the illustrative example, so that the pet owner can identify at a glance the food contained in each compartment. Examples of markings which may be employed for the purposes of the present invention include color codes, a written description, an illustration of the animal(s) from which the food product is derived, and the like. By way of additional example, a wall portion of each compartment may be stamped or otherwise provided with suitable indicia.

By attention to the markings during or after consumption of the meal, the cat owner can readily observe whether one or more of the presented flavors/types of food do not appeal to the cat. As such, the owner may avoid purchasing and serving those flavors in the future. Of course, if all of the flavors introduced by a multiple-compartmented receptacle in accordance with the present invention are met with favor, the owner may either purchase additional multiple-compartmented containers of that type or purchase single serving receptacles containing one of these favored flavors.

Figure 4:
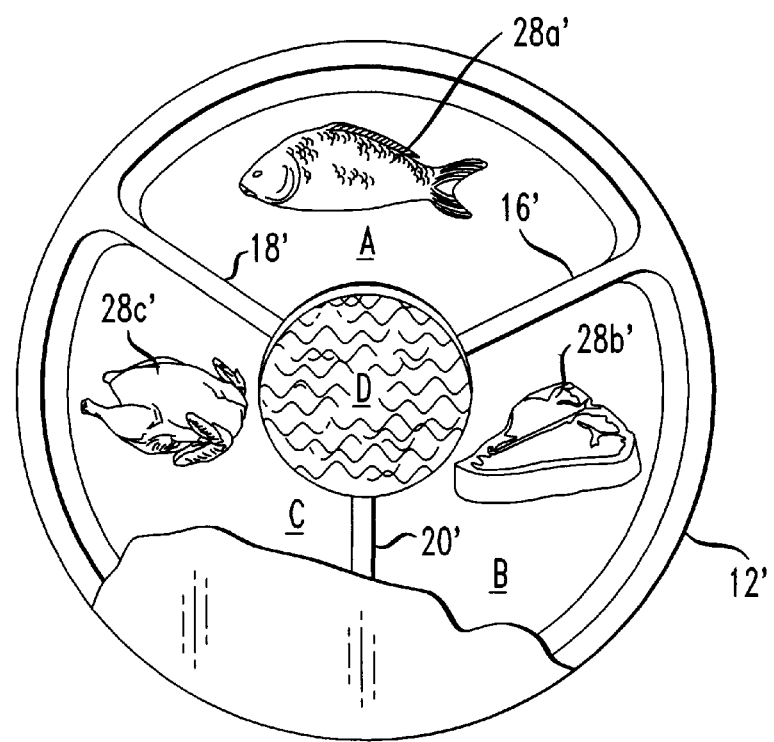
FIG. 4 is a plan view depicting a receptacle employed in a food serving system constructed in accordance with a modified embodiment of the present invention, the receptacle being shown with the cover partially broken away to reveal an illustrative arrangement of both food containing compartments and a water receiving compartment.

FIG. 4 is a plan view depicting a receptacle employed in a food serving system 10' constructed in accordance with a modified embodiment of the present invention, the receptacle 12' being shown with the cover partially broken away to reveal an illustrative arrangement of both food containing compartments A', B', and C' and a water receiving compartment D. Essentially, the embodiment of FIG. 4 is similar to that presented in FIGS. 1–3, the difference being the addition of an empty compartment D. The inclusion of empty compartment D further enhances the convenience of the serving system of the present invention in that it obviates the need for a separate water bowl. It will also be observed that in the embodiment of FIG. 4, the food type or flavor identifying indicia 28a', 28b', and 28c' take the form of stamped shapes to graphically illustrate the animals from which the food contained in each compartment are derived.

As will be readily apparent to those skilled in the art, the present invention may be produced in other specific forms without departing from its spirit or essential characteristics. The present embodiments, therefore, are to be considered as illustrative and not restrictive, the scope of the invention being indicated by the appended claims rather than the foregoing description, and all changes which come within the meaning and range of the equivalence of the claims are therefore intended to be embraced therein.

What is claimed is:

1. A point-of-purchase food serving article for dispensing a plurality of differently flavored cat food products, comprising:

a sealed receptacle having a top wall, a bottom wall, and at least one sidewall, said receptacle defining a plurality of compartments each containing a corresponding one of the differently flavored cat food products such that a cat may eat directly from said receptacle; and indicia respectively associated with each of said plurality of compartments to identify the flavor of the cat food product contained therein, said indicia comprising a plurality of markings on one of said bottom wall and said at least one side wall, each of said plurality of markings identifying one of the differently flavored cat food products and being in permanent registration with a corresponding compartment containing one of the differently flavored cat food products, whereby upon opening and presenting said receptacle to a cat for consumption, a cat owner may observe which of the differently flavored cat food products are acceptable to the cat.

2. The article of claim 1, wherein said sealed receptacle defines an additional compartment, said additional compartment being empty and being dimensioned and arranged to receive a quantity of water for consumption by the cat.

3. The article of claim 1, wherein said indicia comprises an exterior label at least partially covering said at least one sidewall, said label having a plurality of markings thereon associated with a corresponding one of the differently flavored cat food products and in registration with a respective compartment.

4. The article of claim 1, wherein said top wall is perforated to define a plurality of independently openable lid portions respectively aligned with a corresponding compartment, whereby an individual compartment may be opened without exposing the contents of other compartments.

5. The article of claim 1, wherein said top wall comprises a removable lid.

6. A process of manufacturing a point-of-purchase food serving article for dispensing a plurality of differently flavored cat food products comprising the steps of:

providing a receptacle defining a plurality of compartments such that a cat may eat directly from said receptacle;

introducing a differently flavored cat food product in at least two of said plurality of compartments;

hermetically sealing said receptacle after said introducing step;

providing, in a second providing step, indicia respectively associated with each compartment containing a cat food product so as to identify the differently flavored cat food product contained therein, said indicia comprising a plurality of markings on one of a bottom wall and a sidewall of the receptacle, each of said plurality of markings identifying one of the differently flavored cat food products and being in permanent registration with a corresponding compartment containing one of the differently flavored cat food products, whereby upon opening and presenting said receptacle to a cat for consumption, a cat owner may observe which of the differently flavored cat food products are acceptable to the cat.

7. The process of claim 6, wherein said second providing step includes applying an external label having said indicia to an exterior surface portion of one of the side wall and the bottom wall of said receptacle.

8. The process of claim 6, wherein said second providing step includes stamping a surface portion of each compartment with said indicia.

* * * * *